United States Patent [19]
Breuers et al.

[11] 4,315,687
[45] Feb. 16, 1982

[54] APPARATUS FOR COPYING FROM PLURAL SHEETLIKE ORIGINALS

[75] Inventors: Theo P. C. Breuers; Johannes P. Hanegraaf, both of Venlo, Netherlands

[73] Assignee: Oce-Nederland B.V., Venlo, Netherlands

[21] Appl. No.: 122,119

[22] Filed: Feb. 19, 1980

[51] Int. Cl.³ .............................................. G03B 27/62
[52] U.S. Cl. ....................................... 355/75; 355/97; 355/106
[58] Field of Search ....................... 355/54, 39, 40, 64, 355/71, 74, 97, 99, 101, 106, 125, 126; 271/15, 226

[56] References Cited

U.S. PATENT DOCUMENTS 3,135,186 6/1964 Hurley .................................... 355/97
3,484,168 12/1969 Toby ..................................... 355/106
3,897,149 7/1975 Zeunen et al. ......................... 355/97
4,184,765 1/1980 Breuers ................................. 355/75

Primary Examiner—Richard A. Wintercorn
Attorney, Agent, or Firm—Albert C. Johnston

[57] ABSTRACT

In an apparatus for copying sheetlike originals, wherein a transport system feeds originals from a positioning surface onto an exposure plate and from the latter after exposure to a receiving tray, the positioning surface presents at least two distinct areas upon each of which an original can be laid ready to be fed in for copying and each area is bordered by a lateral arrest so that plural originals laid ready in the areas and against the arrests will be fed together to exact positions on the exposure plate for copying on one sheet of receiving material in one copying run of the apparatus. A system of open-front trays for piles of originals, each aligned with one of the positioning surface areas, facilitates the laying of originals in ready position. A control system responds to sensed presence of a complete set of originals in ready position to start a run. A special mask assembly is provided on the exposure plate to receive a set of originals and expose select areas of them for copying, as for producing plural prize credit notes by copying simultaneously from plural game forms such as lotto entry forms.

9 Claims, 5 Drawing Figures

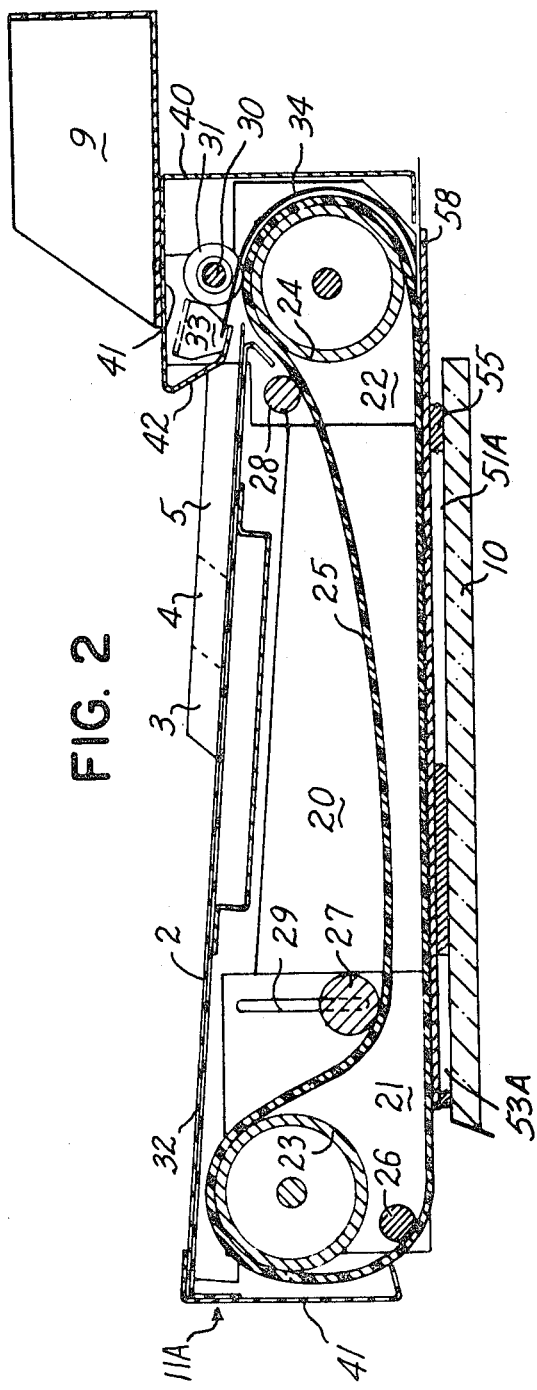
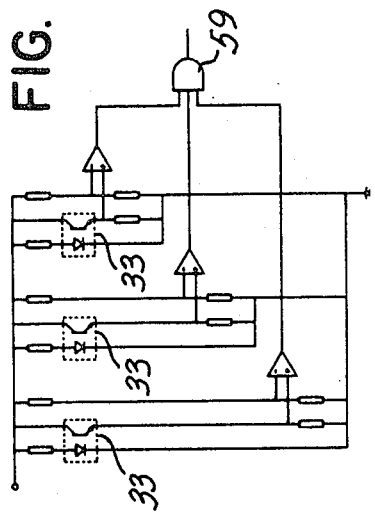

APPARATUS FOR COPYING FROM PLURAL SHEETLIKE ORIGINALS

This invention relates to an apparatus for copying information from plural sheetlike originals simultaneously.

The invention makes use of apparatus of a known type which comprises an exposure plate, a positioning surface on which originals to be copied can be laid ready for copying, and a transport system for transporting the sheetlike originals from the positioning surface onto the exposure plate and then, after exposure, away from the exposure plate as to a receiving tray.

An apparatus of that type is disclosed in Dutch patent application No. 7703835 and in a corresponding U.S. Pat. No. 4,184,765, the disclosure of which is incorporated herein by reference.

The principal object of the present invention is to provide an apparatus by which the copying of information from plural sheetlike originals simultaneously, such as, for example, from winning lottery tickets onto preprinted forms to make credit notes for issuance to lottery winners, can be carried out simply and more efficiently than in prior practice.

The winners of games of chance, such as lotto or a football pool, usually receive credit notes each of which shows the sum won and, generally, also shows the name and the address of a winner, an identification of the game of chance, the serial number of the winning entry form, or ticket, and an identification of the week or other time period concerned. Since a great number of participants in such games of chance win a same amount of money, the credit notes are often made as follows:

The dimensions of the lottery entry forms are usually such that a set of three of them can be laid side by side in the area occupied by one sheet of A4 size. A mask is made from a white sheet of paper to cover certain parts of three such forms, and with three sets of openings which are so located that they will leave uncovered other parts of each form such as the participant's name and address, the identification of the game, the form number and the week identification. The date and the prize sum are typed on the mask by a typewriter, and the mask thus formed is laid with the typed side downward on the exposure plate of a copying apparatus. Then a thin glass plate is laid on the mask, and on this glass plate three winner's entry forms are placed in exact position and are pressed in place by the device normally covering the exposure plate. Upon then running the copying machine, it reproduces the information present on the mask and the form information left uncovered by the mask, on a preprinted sheet of paper which is used as the image receiving material of the machine. With good positioning of the mask and the original game forms, or tickets, all this can be carried out so that the relevant information is reproduced at the required locations on the receiving sheet. The resulting copy sheet is then subdivided into a number of pieces corresponding to the number of copied forms, thus providing the same number of credit notes.

After a first set of forms has been thus copied, the covering device of the machine is opened, the forms already copied are removed and replaced by a new set of forms of the game participants who won the same prize sum, and a new copy is made to provide several more of the required credit notes. Thus, credit notes for all the winners of a same prize sum are obtained by repeatedly laying a new set of forms on the glass plate overlying the mask and making a copy from each set. Then a group of credit notes can be produced for the winners of another prize sum by modifying the mask and making copies from sets of winners' forms in the same way.

In the case of lotto forms, for instance, the process involves, for each week, replacing the mask some twenty times during the copying. The number of copying runs to be made with each mask form depends of course on the number of participants in the lottery and the number of prize winners.

The described process has the disadvantages that the covering device over the exposure plate of the copying apparatus must be opened and closed repeatedly and the game forms, or tickets, must be positioned on the mask by hand. This takes considerable time. Moreover, there is always a risk that the positioned forms will be displaced by the airstream which is created by the covering device when it is being closed, as a result of which a faulty copy or a faulty credit note will be obtained.

The present invention provides a copying apparatus by which the copying of information from plural sheetlike originals onto a copy sheet, such as from several game forms or tickets through mask openings into a preprinted form sheet, can be carried out simply and efficiently without the above-mentioned disadvantages.

According to the invention, use is made of an apparatus of the type above mentioned, in which the positioning surface is provided with at least two arrests which are disposed in lateral relation to the direction of transport of the originals and which serve as edge positioners for laying ready a corresponding number of originals so that the plural originals can be fed in unison to proper position on the exposure plate and then copied properly on one sheet of receiving material in one copying run of the apparatus.

By means of this invention, the credit notes required for the winners of a lotto game can be produced quicker and with less risk of obtaining faulty copies, because it is not necessary to open and close the device covering the exposure plate in order to position the forms to be copied, and after the forms of a set have been laid ready for copying their position will not be changed unknowingly.

For carrying out the invention it is advantageous to adapt an apparatus such as that disclosed in the above-mentioned Dutch patent application and U.S. Pat. No. 4,184,765.

In such a case, for the production of credit notes by copying from lotto entry forms, three of the forms can be laid ready and then introduced at the same time onto the exposure plate for copying.

In order to obtain a practical operation, it is advantageous to provide and use a special type of mask which is made up of a clear film, such as a film of polyethylene terephthalate, and an actual mask sheet applied against the film. The mask sheet is provided with the necessary openings and has applied to it a protection sheet which at its inner side, at the respective locations where the prize amount and the date must be shown, is provided with a layer of pressure-sensitive material, such as a layer of a carbon composition, that is transferable by the typewriter. The mask assembly thus formed can easily be brought into a typewriter for typing in the date and the appropriate amount, after which the protection sheet is removed and the rest of the mask is placed on the exposure plate of the copying apparatus and is positioned there so that a lotto form delivered to the plate by the original feeding means of the apparatus will arrive on the transparent film at exactly the required location over the mask sheet.

For facilitating the operations, according to a further feature of the invention, that part of the housing of the covering device which overlies the nip of the means for feeding the originals to be copied is provided with a set of small trays, each slightly wider than the forms to be copied, which are located side by side and are each aligned with one of the areas bordered by the arrests provided on the positioning surface. Piles of the forms can be placed in these trays in readiness for being slid easily from them, one form at a time from each tray, and placed directly onto adjacent areas of the positioning surface.

The above-mentioned and other objects, features and advantages of the invention will be further evident from the following description and the accompanying drawings of an illustrative embodiment of the invention.

In the drawings:

FIG. 2 is a vertical longitudinal sectional view of the original positioning, feeding and covering structures of such an apparatus;

FIG. 5 is a diagram of a modification of a circuit for controlling operations of the copying apparatus.

Figure 1:
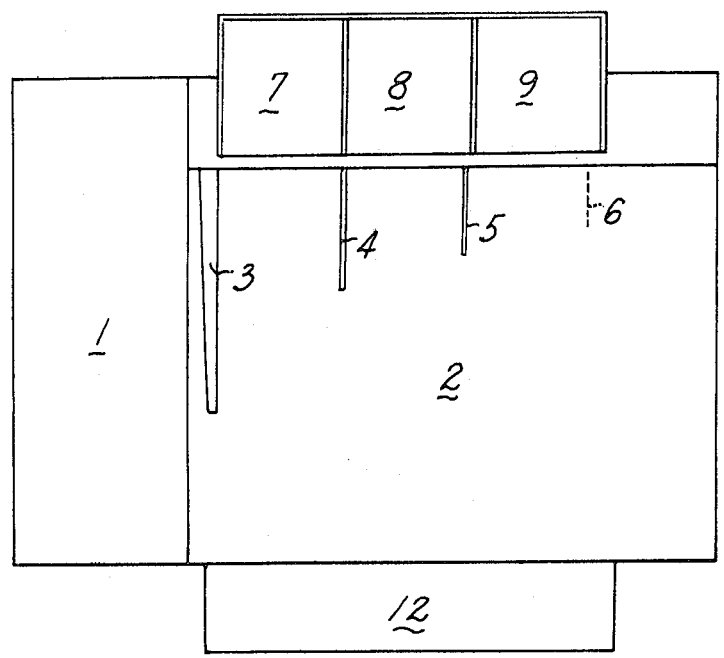
FIG. 1 is a schematic top plan view of a copying apparatus provided with means for positioning multiple originals in readiness to be fed to an exposure plate and copied simultaneously according to the invention.

Referring first to FIG. 2, a device 11A is there shown for positioning, feeding and covering originals from which information is to be copied through an exposure plate 10 of a copying machine that is not otherwise illustrated. The device 11A corresponds substantially in construction and operation to the device 11 described in U.S. Pat. No. 4,184,765, but comprises modifications as herein described.

The device 11A comprises two parallel frame plates 20 between which its functional parts are mounted. First and second pairs of bearing blocks 21 and 22, respectively, are mounted against the confronting sides of the plates 20. Only one bearing block of each plate is illustrated. A roller 23 is mounted and freely rotatable in the bearing blocks 21, and a roller 24 is mounted and freely rotatable in the bearing blocks 22. An endless belt 25 is positioned about and extends between the rollers 23 and 24 so that the lower flight of this belt extends over the plate 10 and preferably somewhat beyond the respective plate edges nearer to the rollers 23 and 24.

The belt 25 is further positioned and is tensioned by freely rotatable rollers 26, 27 and 28 which also are mounted in the bearing blocks of the frame plates. The rollers 26 and 28 serve as guide rollers. At least one of the belt positioning rollers, for instance roller 27 which bears downward against an upper flight of the belt 25, is supported displaceably relative to the frame of the device 11A, as by engagement of the roller shaft in elongated openings such as slots 29 provided in the bearing plates 21. Thus, the position of the roller 27 and correspondingly of the belt will change in response to a change of the position or of pressure against the lower flight of the belt.

The belt 25 is made of an elastic material, such as rubber or a synthetic elastomer, and it has a white, suitable reflecting outer surface.

A portion of the belt 25 extending over the roller 24 cooperates at its outer side with a pressing roller 31 to form a nip for feeding sheetlike originals to the exposure plate 10. The pressing roller preferably comprises freely rotatable rubber discs mounted on a shaft 30 which is supported in slots (not shown) so that the rubber discs are pressed down by gravity against the belt 25 on the roller 24.

A feed table 32 presents a flat upper surface at 2 for positioning sheetlike originals in readiness to be copied. This surface extends from a location over the roller 23 to a location adjacent to the nip between the roller 31 and the belt on roller 24. A photoelectric detecting element 33 is mounted just ahead of and above the said nip, so that this element will sense the presence or absence of an original in ready position on the feed table and will emit a signal correspondingly. A guide plate 34 extends about the roller 24 from a location at the original feeding nip to a location near one edge of the exposure plate 10.

The shaft of the roller 23 extends outside the frame formed by the plates 20, into a housing 1 at one side of this frame (see FIG. 1). This roller shaft is connected there with the driving mechanism and the control system of the machine, as described more particularly in the aforesaid U.S. patent. Thus, the roller 23 is driven to drive belt 25 when both a drive motor and an electromagnetic coupling are energized.

The device 11A is further provided with end housings as illustrated at 40 and 41 in FIG. 2. Housing 40 overlies the feed nip provided by the roller 31 bearing against the feed belt 25 on roller 24, and a front portion 42 of housing 40 limits the passageway to the feed nip.

In accordance with the present invention, the flat positioning surface 2 of device 11A is provided with a plurality of arrests, or lateral edge positioners, against which a plurality of originals such as lottery entry forms can be easily laid ready for being fed at the same time to and copied simultaneously through the exposure plate 10. As illustrated in FIGS. 1 and 2, an upstanding arrest 3 is installed at the left side of the surface 2, against which arrest a first form can be laid ready. At a distance away from arrest 3 at least equal to the width of the forms to be copied, a second arrest 4 protrudes upward from the surface 2, and at the same distance from arrest 4 a third upstanding arrest 5 is installed. If so desired, even a fourth arrest 6 may be provided at the same distance from arrest 5.

The several arrests lie parallel to the direction of transport of originals from the surface 2, and preferably extend up to the passageway at the front 42 of housing 40. Further, they preferably differ in length, the longest being the arrest 3 at the left side of surface 2 and the arrests 4 and 5 and any arrest 6 being progressively shorter, so that a form can be laid against any of the arrests by one's right hand without obstruction of the hand motion.

By virtue of the arrests here provided, three of the forms to be copied can be quickly and accurately laid ready beside one another on the table surface 2, in such a way that the respective left edges of these forms lie next to the arrests 3, 4 and 5 while their leading edges lie in the feed nip formed between the roller 31 and belt 25 at roller 24.

For facilitating manipulations, the top 41 of the end housing 40, which overlies the feed nip, is provided with an open bin comprising three small trays 7, 8 and 9 which are arranged side by side and have open fronts aligned respectively with the areas of surface 2 bordered by the arrests 3, 4 and 5. The width of each tray is slightly greater than the width of the forms to be copied, and the height is sufficient to hold a pile containing a considerable number of the forms. Thus, forms piled in the trays 7, 8 and 9 can easily be slid individually from them by hand and placed on the respective surface areas against the arrests in readiness for being fed to the exposure plate 10 for copying.

Figure 3:
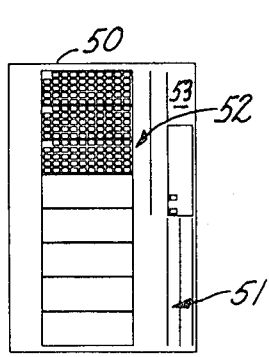
FIG. 3 is a schematic plan view of a lotto ticket, or game form, of a type suitable for being copied by use of the invention.

FIG. 3 of the drawings illustrates a lotto game entry form 50 which is provided with an area 51 to show a participant's name and address, an area 52 to show the serial number of the form and an area 53 for identification of the game.

Figure 4:
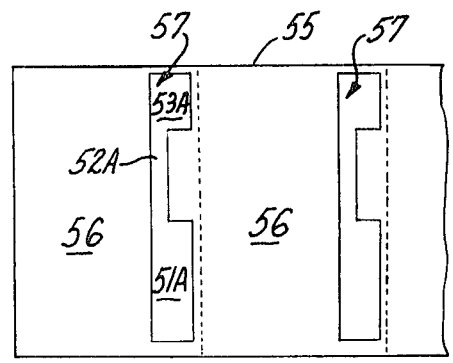
FIG. 4 is a schematic plan view, partly broken away, of a mask suitable for use in copying appropriate information from three of the game forms.

FIG. 4 shows a mask sheet 55 suitable for use in copying information from several of the forms 50 as desired for making corresponding credit notes. The mask sheet 55 is for instance a white sheet of paper corresponding in size to the area encompassing three of the forms when they are laid ready on the surface 2 of the copying apparatus. For each form the mask sheet provides a covering portion 56 and an opening 57. Each opening 57 comprises open areas 51A, 52A and 53A through which, upon correctly positioning a form 50 over an area of the mask, the areas 51, 52 and 53, respectively, of the form 50 will be exposed for copying the information visible on them.

The mask sheet 55 is prepared for use in the manner hereinbefore described. For instance, a suitably smooth and stiff transparent film, preferably a sheet 58 (FIG. 2) of clear polyethylene terephthlate film, is applied over one of its sides. Its other side, the underside in use, is covered by a protection sheet adhered to the mask sheet and carrying at areas over select mask areas a pressure sensitive coating such as a transferable carbon black composition. This mask assembly is placed in a typewriter by which the date and the amount of a prize sum are typed at the select areas so that corresponding imprints are made on the under side of the mask sheet. Then the protection sheet is pulled off the mask sheet.

The remaining mask unit, composed of the mask sheet 55 and the transparent sheet 58, is placed on the exposure plate 10 of the copying apparatus at a location such that a set of winners' entry forms fed to the plate 10 by the transport belt 25 will arrive in proper copying position over the mask. As indicated in FIG. 2, an end portion of the transparent sheet 58 extends to a location where the leading edge of a form or forms being passed by the belt from the guide 34 about roller 24 will engage and be slid along the upper side of the transparent sheet as the forms are fed to the copying position.

The structures and manner of operation of the copying apparatus, by which an original or originals will be brought to a certain copying position over the exposure plate 10, are set forth in the aforesaid U.S. Pat. No. 4,184,765. In general, a person operating the machine presses its print button, which causes its drive motor and coupling to be energized so that an original laid ready in the feed nip is transported by the belt 25 along the guide 34 and from it along the exposure plate 10 or, in the present case, along the transparent sheet 58 overlying the mask 55 on the exposure plate.

As soon as the leading edge of the original reaches a predetermined copying position on plate 10, the drive coupling is de-energized to stop the belt movement, whereupon a copying cycle of the machine is started. After the original has been exposed in a copying cycle, the drive coupling is again energized to drive the belt, thus moving the original off the plate 10 for delivery into a receiving tray 12 (FIG. 1) located below the roller 26. If in the meantime a new original has been laid ready on surface 2 of the feed table 32, the new original is automatically introduced while the previous original is being removed from the exposure plate.

In order to stop the original at an exact location on the plate 10, the roller 24 is driven through a certain number of revolutions upon each energization of the drive coupling. For instance, by making two revolutions of the roller 24, the belt 25 and an original engaged with it will be moved through a distance which corresponds to the distance between the nip at the roller 31 and a so-called zero-point or desired copying position on the exposure plate.

The complete operation will be further understood from the description in said U.S. patent of a suitable electrical control circuit illustrated in FIG. 3 of the patent. That circuit is suitable for practices of the present invention in which the feed-in of originals will occur only if the detector 33 senses an original in ready position next to one of the arrests, for instance, the left-most arrest or edge guide 3. A modification of that control circuit as illustrated in FIG. 5 of the present drawings is provided if it is desired that the feeding of originals will occur only when originals to be copied are in ready position beside all three of the arrests 3, 4 and 5. For this purpose, three detectors 33 are installed at locations to sense individually three originals placed in ready position, and a circuit as shown in FIG. 5 is used instead of the circuit section containing elements 33 and 55 as shown in FIG. 3 of said U.S. patent. In this case, an output from the AND-gate 59 of FIG. 5 will cause the drive mechanism to start the feed-in operation when the third of three originals has been placed in ready position on the surface 2.

In the practice of the invention for the production of credit notes from lotto entry forms, a special mask is prepared as described above and laid on the exposure plate 10, and piles of winners' entry forms are placed in the trays 7, 8 and 9. The operator of the apparatus then, by hand, takes three forms, one at a time out of each tray, and lays each form 50 directly down from its tray onto the adjacent area of the table surface 2, at the same time sliding the form laterally against the related arrest 3, 4 or 5 and forward into the feed nip where a detector 33 senses the presence of the form in ready position. When the third form is thus placed and sensed in ready position, a signal issues from element 59 of the feed-in control circuit (FIG. 5), whereupon the drive of the machine is activated. The three forms in ready position then are transported together about roller 24 and onto and along the transparent foil sheet 58 of the mask unit until they reach the predetermined copying position over the exposure plate. In that position of the three forms, their respective areas 51, 52 and 53 to be copied overlie respective windows 57 of the mask sheet 55.

A copying run of the machine then takes place under the control of its control circuit, with the use as its image receiving material, or copy sheet, of a sheet preprinted suitably for making three credit notes. The copying run results in the reproduction on the preprinted sheet of information on the three forms that is exposed through the mask openings 57, and of the date and the prize sum imprinted on the underside of the mask sheet 55. At the end of the run the copy thus made is delivered into the receiving tray 12.

During the copying the operator has time to lay ready a new set of three of the forms taken from the trays 7, 8 and 9. If the new set has been completely laid ready, a copying run for the new set will start as soon as the machine has completed copying the first set of forms; otherwise, the new run will start when the operator has completed laying three new forms ready.

If the apparatus is provided with only detector 33, as for sensing the presence or absence of an original in ready position against the arrest 3, the operator will lay ready a set of forms by placing the first form on the surface area next to the arrest 5, then the second form on the surface area next to the arrest 4, and finally the third form on the surface area next to arrest 3. Thus, the copying run will start automatically after the third form has been laid ready against the arrest 3, as only at that moment is the sensor excited.

It should be observed that upon the feeding of three new forms to the position for exposure the forms present there after the preceding exposure are automatically ejected and laid down in the receiving tray 12. When the last set of forms of a group to be copied with the same mask has been exposed over the plate 10, this set may be ejected by a special activation of the drive for the belt 25, as by means of a switch provided for this purpose. On the other hand, the last set of forms can be removed by hand when the device 11A for automatically feeding the originals is lifted away from the exposure plate, as usually must occur after exposure of the last set of forms of one group in order to remove the mask or to replace it by a mask appropriate for the winners' forms of another group.

What is claimed is:

1. Apparatus for copying plural sheetlike originals simultaneously comprising, in a photocopier including an exposure plate and means for producing on a sheet of receiving material a copy of sheetlike material exposed in copying position on said plate, a positioning surface on which a plurality of similarly sized sheetlike originals can be laid parallel to each other, means to abut and align the respective leading edges of such originals laid on said surface to a position making them ready to be copied, and transport means for feeding such originals so laid ready from said surface to said copying position for exposure and afterward away from said plate, said positioning surface having at least two distinct areas for separately receiving the originals and having thereon for each of said surface areas an arrest located at one side of the surface area, and at relatively the same side thereof as the arrest for each other of said surface areas, so that such plural originals respectively laid ready in said areas with respective lateral edges of the originals placed against the related arrests will be fed by said transport means to respective exact copying positions over said exposure plate.

2. Apparatus according to claim 1, said positioning surface being on the top panel of a covering device that normally covers said exposure plate and houses a transport belt comprised in said means for feeding the originals.

3. Apparatus for copying plural sheetlike originals simultaneously comprising, in a photocopier including an exposure plate and means for producing on a sheet of receiving material a copy of sheetlike material exposed in copying position on said plate, a positioning surface on which a plurality of originals can be laid ready to be copied, transport means for feeding originals so laid ready from said surface to said copying position for exposure and afterward away from said plate, said positioning surface having at least two distinct areas for separately receiving originals and having at a side of each of said surface areas an arrest so located that plural originals respectively laid ready in said areas with a lateral edge of each original placed against the related arrest will be fed by said transport means to respective exact copying positions over said exposure plate, and detector means for sensing the presence of an original laid ready in at least one of said surface areas and means responsive to said detector means for starting a run of said transport means and said copy producing means.

4. Apparatus according to claim 3, said detector means including plural means respectively for said surface areas for sensing the presence of an original laid ready in each of said surface areas and means responsive to said detector means for starting a run of said transport means and said copy producing means only when originals have been laid ready in all of said surface areas.

5. Apparatus according to claim 1 or 2, the respective arrests of said surface areas being of different lengths along the direction of transport of originals from said surface.

6. Apparatus according to claim 5, said arrests being at the respective left sides of said surface areas and the longest of said arrests bordering the left-most of said areas.

7. Apparatus for copying plural sheetlike originals simultaneously so as to produce on a single sheet of receiving material select information copied from each of the plural originals, comprising, in a photocopier including an exposure plate and means for producing on a sheet of receiving material a copy of sheetlike material exposed in copying position on said plate, a positioning surface on which a plurality of originals can be laid ready to be copied, transport means for feeding originals so laid ready from said surface to said copying position for exposure and afterward away from said plate, said positioning surface having at least two distinct areas for separately receiving originals and having at a side of each of said surface areas an arrest so located that plural originals respectively laid ready in said areas with a lateral edge of each original placed against the related arrest will be fed by said transport means to respective exact copying positions over said exposure plate, and a mask assembly placed on said exposure plate at a location to receive plural originals fed to said exact copying positions, said mask assembly including a white mask sheet having openings therethrough to register with respective select areas of said originals in said copying positions and a smooth, substantially stiff transparent film sheet overlying said mask sheet to receive and support said originals as they are fed from said surface areas.

8. Apparatus according to claim 7, said transport means including an endless transport belt guided about a roller at the location of the leading edges of originals laid ready on said surface areas and a guide plate curved about said roller for guiding originals fed by said belt about said roller to said exposure plate, said transparent film sheet having an end portion thereof extending beyond said mask sheet and said exposure plate to a location beneath the lower end of said guide plate.

9. Apparatus according to claim 7 or claim 8, said transparent film sheet being a sheet of clear polyethylene terephthalate film.

* * * * *